United States Patent [19]

Kaminski et al.

[11] Patent Number: 4,499,980
[45] Date of Patent: Feb. 19, 1985

[54] ACTUATOR FOR ROLLER CLUTCH DRIVE SYSTEM

[75] Inventors: David C. Kaminski, Sylvania; Dennis W. Shea, Toledo, both of Ohio

[73] Assignee: Dana Corporation, Toledo, Ohio

[21] Appl. No.: 432,046

[22] Filed: Sep. 30, 1982

[51] Int. Cl.³ .................... F16D 27/10; F16D 15/00
[52] U.S. Cl. .................... 192/35; 192/48.8; 192/48.92; 192/72; 192/93 C
[58] Field of Search .................... 192/35, 36, 38, 44, 192/48.8, 48.92, 49, 72, 84 T, 93 C

[56] References Cited

U.S. PATENT DOCUMENTS

| | | | |
|---|---|---|---|
| 224,168 | 2/1980 | French | 192/44 |
| 1,144,067 | 6/1915 | Rundolf | 192/44 |
| 1,163,803 | 12/1915 | Bickford | 192/44 |
| 1,899,834 | 2/1933 | Thomas et al. | 192/44 |
| 1,972,484 | 9/1934 | Hobbs | 188/81 |
| 2,269,965 | 1/1942 | Wemp | 192/47 |
| 2,418,019 | 3/1947 | Fast | 192/93 C |
| 2,506,713 | 5/1950 | Fast | 192/93 C |
| 2,721,638 | 10/1955 | Palm | 192/47 |
| 2,910,159 | 10/1959 | Nielsen | 192/84 T |
| 2,926,765 | 3/1960 | Heid | 192/48 |
| 3,099,339 | 7/1963 | Barlow | 192/37 |
| 3,123,169 | 3/1964 | Young et al. | 180/44 |
| 3,164,234 | 1/1965 | Tamarin | 192/40 |
| 3,300,002 | 1/1967 | Roper | 192/35 |
| 3,414,096 | 12/1968 | Reed | 192/38 |
| 3,788,435 | 1/1974 | Prueter | 192/35 |
| 3,827,524 | 8/1974 | Kagata | 180/70 |
| 3,907,083 | 9/1975 | Nieder | 192/41 A |
| 4,030,581 | 6/1977 | Giometti | 192/16 |
| 4,098,379 | 7/1978 | Fogelberg et al. | 192/38 |
| 4,230,211 | 10/1980 | Goto et al. | 192/35 |
| 4,284,183 | 8/1981 | Brisabois et al. | 192/48.92 |
| 4,352,418 | 10/1982 | Teraoka | 192/36 |

Primary Examiner—George H. Krizmanich
Attorney, Agent, or Firm—Frank B. McDonald

[57] ABSTRACT

An apparatus for positively engaging and releasing a roller clutch actuator in a two-way overrunning roller clutch system 10 includes an actuator ring 54 having a plurality of detents 58 for receiving a radially extending, reciprocably moveable plunger 60. In a preferred form, the roller clutch drive system includes an axle case 38 containing a complimentary pair of drive and driven rotary members. The drive member 46 includes an axially extending bore, and the driven member 48 has one end thereof disposed within the bore. The drive and driven members together define an axially extending annulus 51 which contains a plurality of axially oriented rollers 42 circumferentially contained therein by a cage 50. The cage maintains the rollers in uniformly spaced relationship, and includes a friction ring 52 preferably integral therewith. The actuator ring surrounds the friction ring in constant, resilient, frictional engagement therewith. A transversely extending cam member 70 moves transversely with respect to the plunger, the cam member including a cam surface 66 engageable with the plunger for selectively and reciprocably moving the plunger into and out of engagement with the detents.

2 Claims, 5 Drawing Figures

ACTUATOR FOR ROLLER CLUTCH DRIVE SYSTEM

BACKGROUND OF THE INVENTION

This invention relates to actuators for overrunning roller clutches of the type commonly employed between drive and driven members of vehicles having auxiliary driving axles. More particularly, the invention relates to actuators of the positive engagement type whereby frictional losses are eliminated during disengagement of the clutch or whenever the clutch is in its "free wheeling" mode.

Numerous prior art devices have been utilized which afford positive engagement and disengagement of roller clutches. However, even though such devices have been successful in avoiding friction losses and the inadvertent actuation potential associated with actuators of the non-positively engaging type, the latter positive engagement actuators tend to be plagued by an increased wear of parts and a jerkiness to vehicular operation as created by the abrupt nature of the engagement of such devices.

For example, U.S. Pat. No. 3,123,169 to R. C. Young et al discloses a roller clutch actuator of the positive engagement type. The cage member 44 therein includes serrations which engage mating serrations of a friction ring selectively engageable therewith. The result is a dog clutching action, which is associated with the aforenoted jerkiness and accelerated wear of parts. Although the system disclosed therein includes many positive virtues, a more desirable system would be one in which a less abrupt, hence more time-controlled actuation occurs, and one in which the resultant roller clutch engagement is positive, yet resilient.

SUMMARY OF THE INVENTION

This invention provides an improved positively engaging actuator for overrunning roller clutches. The actuator engagement structure features a positive yet resilient actuator engagement, and is thus without the abruptness or jerkiness commonly associated with actuators of the positively engaging type.

In a preferred form, the improved actuator structure embodies an actuator ring which includes at least one radially oriented detent, along with a plunger adapted for radial movement into positive engagement with the ring. The actuator ring is resiliently banded about a friction ring, which in the preferred embodiment is an integral extension of the roller clutch cage. A transversely extending cam member includes a cam surface which engages the plunger to selectively move the plunger into and out of engagement with the detent, the plunger being normally spring loaded into a disengaged position.

Also in the preferred embodiment the cam member is remotely actuable (from the vehicle cab) by an electric solenoid, although other means are suitable therefor. The cam member engages a pair of the aforesaid plungers, which selectively and simultaneously engage actuator rings on a pair of overrunning clutches situated on a pair of half-axles. The latter arrangement provides a system requiring no differential gearing, as upon cornering of an associated vehicle, the slower or inside axle will always be driven while the faster or outside axle will overrun.

These features and numerous others will become more fully apparent upon the following detailed description of preferred embodiments of the apparatus.

DETAILED DESCRIPTION OF A PREFERRED EMBODIMENT

Figure 1:
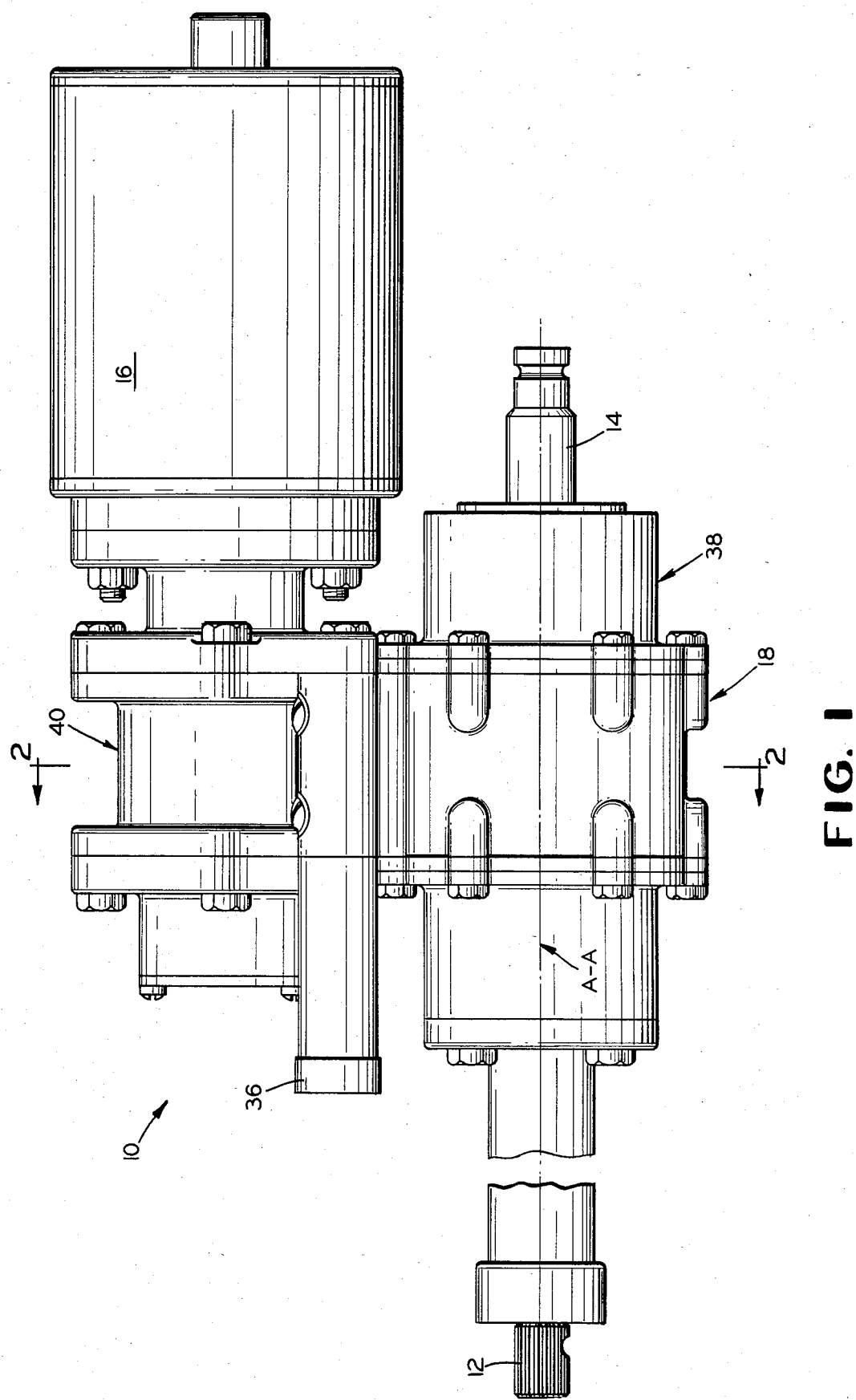
FIG. 1 is a side view of a roller clutch drive system which incorporates the improved actuator apparatus of the present invention.
Figure 2:
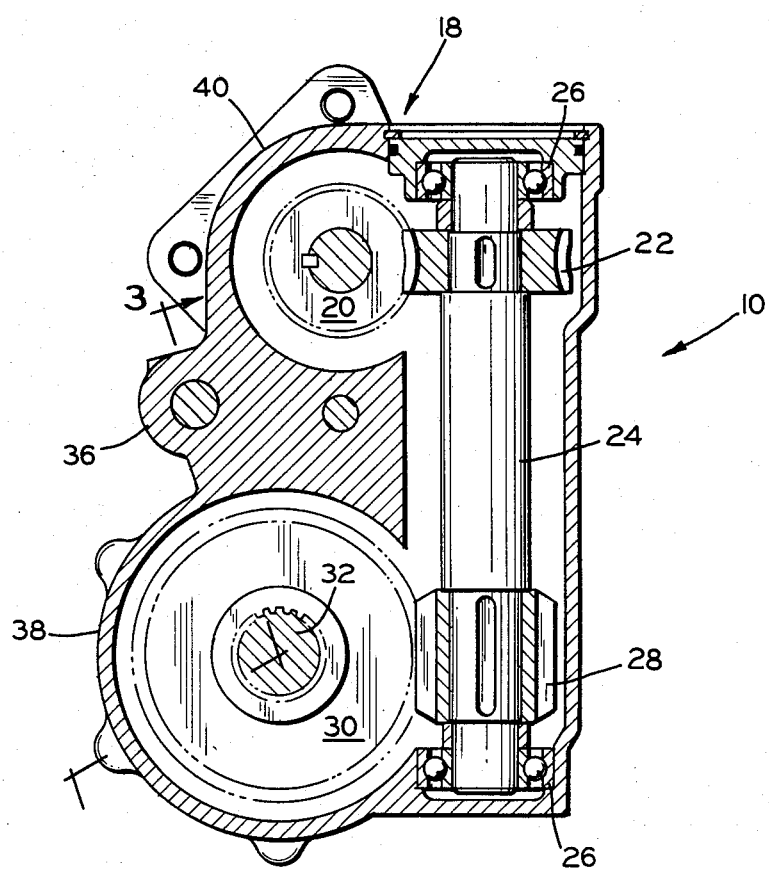
FIG. 2 is a sectional view along lines 2—2 of FIG. 1.
Figure 3:
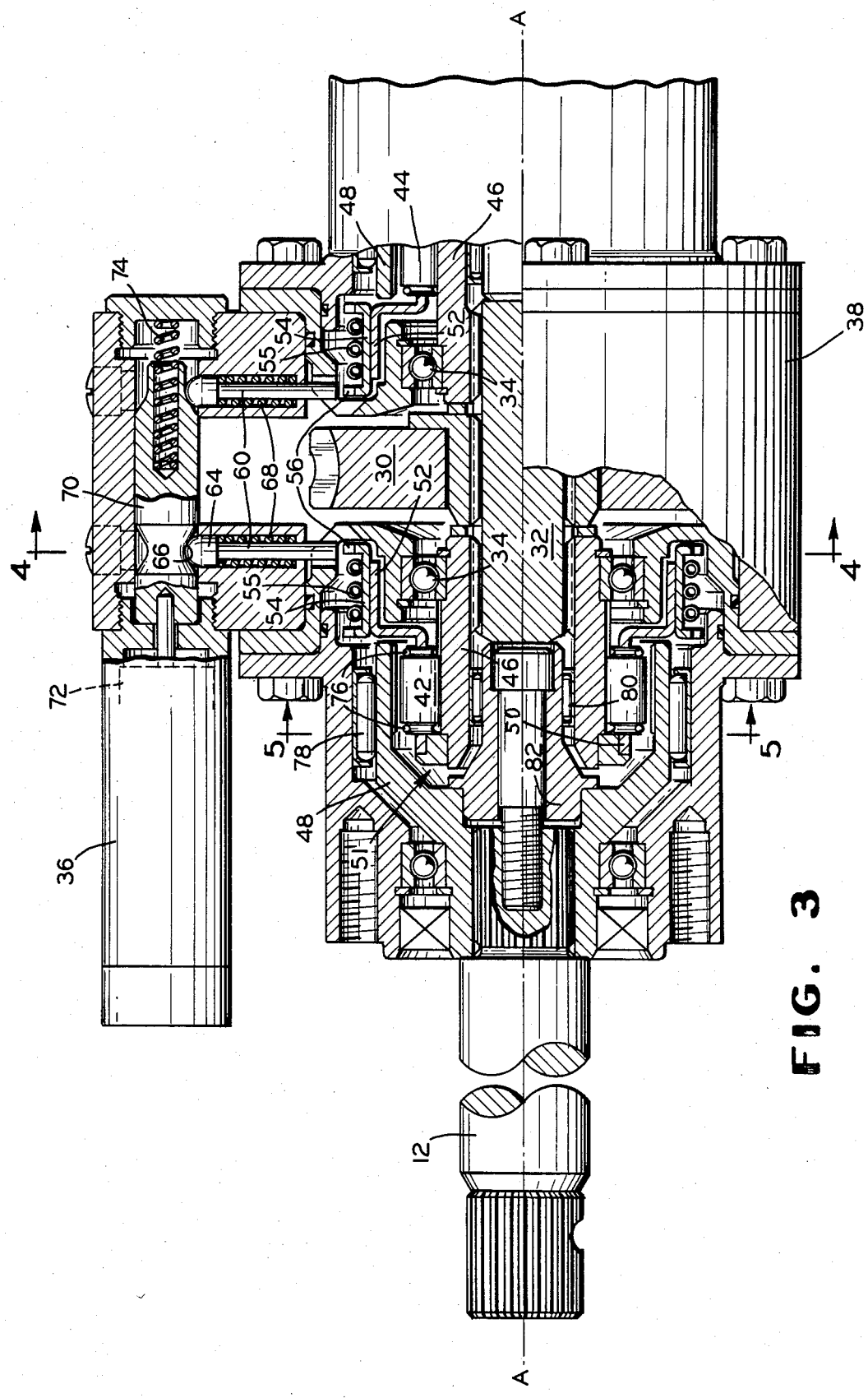
FIG. 3 is a sectional view along lines 3—3 of FIG. 2.

A roller clutch drive system 10 which incorporates the improved actuator mechanism of this invention is shown in FIG. 1. The drive system 10 includes left and right axles 12 and 14, respectively, which are driven by an electric motor 16 through a gear reduction apparatus 18. In the preferred embodiment, the electric motor 16 is a reversible motor. Referring also to FIG. 2, the motor 16 drives a worm gear 20, which meshes with a worm gear 22 keyed to the upper end of a gear shaft 24 supported in bearings 26 as shown. A second worm gear 28, supported on the lower end of the gear shaft 24, meshes with a worm gear 30, which in turn is fixed to a stub axle 32 (see FIG. 3). Referring to FIGS. 1–3, it will be apparent that the left and right axles 12 and 14, the stub axle 32, and the worm gear 30 all share the same axis A—A, and all are encased within an axle housing or case 38, which forms the lower portion of the gear reduction system 18. A motor gear housing 40 forms the upper portion of the gear reduction system as shown.

FIG. 3 depicts in greater detail the axle case 38 and an associated axle member 12. It also includes a view of a solenoid 36, as also shown in FIG. 1. The axle case 38 contains a roller clutch system comprising sets of rollers 42 and 44 positioned on opposite sides of the axle worm gear 30. Each set of rollers 42, 44 includes a cage 50, a friction ring 52, and an actuator ring 54 positioned in circumferential frictional resilient engagement with the friction ring 52. The solenoid 36 operates a transversely extending cam member 70 which interacts with a radially extending plunger 60 to control actuator ring movements as now herein more particularly described.

As both sets of clutch rollers 42, 44 are actuated in essentially the same manner, the actuation of only one set of rollers, 42, will be described herein. The axle worm gear 30 is rigidly affixed to the stub axle 32 for rotation thereof within the axle housing 38. Splined to the stub axle is a drive member 46 which is supported on bearings 80 for rotation about a spacer-support member 82 within the housing 38 as shown. The drive member 46 defines an annular inner bearing race for clutch rollers 42, which are adapted to selectively engage an output or driven member 48.

Figures 4, 5:
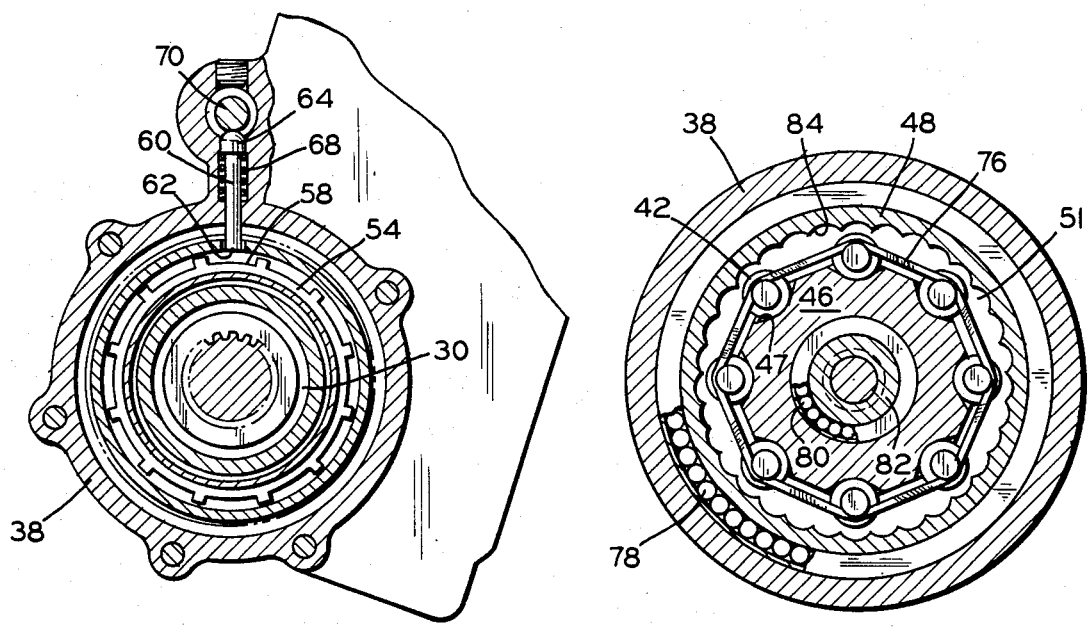
FIG. 4 is a sectional view along lines 4—4 of FIG. 3.
FIG. 5 is a sectional view along lines 5—5 of FIG. 3.

Input and output members 46 and 48, as well as rollers 42 are also shown in FIG. 5. The annularly positioned plurality of rollers contain garter springs 76 (see also FIG. 3) which resiliently engage the respective ends of the rollers per standard practice by those skilled in the roller clutch arts. It will also be apparent that the stub axle 32 and its splined input member 46 are supported for rotation within bearings 34, which are in turn supported in the fixed casing 38. The cage member 50 uniformly spaces each roller 42 within an axially extending annulus 51, which is bounded and hence defined by the input member 46 and the output member 48. The cage 50, in the preferred embodiment, contains the friction ring 52 as an integral extension thereof. The actuator ring 54 resiliently encompasses the friction ring 52 for frictional engagement therewith at all times.

Referring now to FIG. 4 it will be seen that the actuator ring 54 contains a plurality of detents 58 which are utilized for selective engagement with the radially inward end 62 of the plunger 60. In the preferred form, the detents are contained within a flanged portion 56 of the actuator ring, and are disposed uniformly about the ring as shown. The plunger 60 is normally spring loaded away from the detents and toward the cam member 70; the plunger is hence normally in the disengaged position (See FIG. 3). For this purpose, a plunger spring 68 is employed to bear against a radially outward end 64 of the plunger, which in turn bears against a cam surface 66 of the cam member 70. Also in the preferred embodiment, as part of the solenoid 36, is a piston 72 which selectively actuates the cam member 70 against the bias of a cam spring 74. In the preferred form, energization of the solenoid automatically results whenever the auxiliary drive motor 16 is actuated, and results in fulltime engagement of the plunger end 62 with the detents 58 while the auxiliary motor is "on". Finally, the bearings 78 provide support for the output member 48 relative to the axle case 38. The output member 48 is in turn splined to the left axle 12 for driving rotation thereof as will be appreciated by those skilled in the art.

The operation of the roller clutch actuation mechanism may now be described as follows. Referring first to FIG. 5, it will be appreciated that during the overrunning mode, the rollers 42 will be positioned centrally, or at the bottom of each convolution 47, of the input member 46 as shown. This latter characteristic is assured by the roller clutch springs 76 which, as described, encircle the lateral edges of each roller 42 (see FIG. 3). When positive engagement is desired however, the vehicle operator will energize the motor 16, hence the solenoid 72, which will result in the movement of the cam member 70 rightwardly against the force of the cam spring 74. As a result, the cam surface 66 of the cam member 70 will force the cam surface contacting end 64 of the plunger 60 downwardly against the force of the plunger springs 68. This action will cause the actuator end 62 of the plunger 60 to engage one of the detents 58 of the actuator ring flange 56. As the plunger and cam members are grounded with respect to the axle casing 38, the result will be a drag on the friction ring 52. This result is created by the frictional contact between the friction ring 52 and the actuator ring 54 at the time the latter becomes grounded by the aforesaid plunger action. The resultant drag on the friction ring 52 will retard the motion thereof relative to the movement of the rollers 42. The rollers will thus leave their centralized positions about the spinning input member 46, and will ride up one side of their respective convolutions 47 to engage the flutes 84 of the output member 48 (FIG. 5). This will cause the engagement or lock-up of the input and output members 46 and 48, respectively. In the preferred form, the operation of the actuator devices as herein described will be amenable to both counter-clockwise and clockwise rotation of the respective members 46 and 48 relative to one another; thus the invention herein is suitable for application to a two-way overrunning roller clutch system.

In the prefered use of the roller clutch drive system 10 as an auxiliary drive system in a motor vehicle, the electric motor will normally be de-energized, and as a result the primary motive source of the vehicle will be through other means, such as by an internal combustion engine operative through a separate primary axle system. Because in the normal driving mode the solenoid will be de-energized, the plunger will normally be disengaged from the detents of the actuator ring. As a result, the invention herein provides a method of positive disengagement of the drag means normally associated with an auxiliary driving axle. Although the actuator ring 54 and the friction ring 52 are in constant frictional engagement, they do not result in the undesirable drag usually present in systems having similarly engaged rings. This is because the actuator ring is not grounded when the auxiliary drive means are not in use. A principal advantage of the invention as herein described is the provision of a positive lock-up member in combination with a resilient frictional member. Thus, as was mentioned earlier in connection with the prior art positive lock-up devices, positive engagement systems are quite abrupt. In the present invention however, the actuator plunger 60 must first engage the actuator ring 54, which then momentarily slides about the friction ring 52 creating a controlled, and hence more resilient, arrest of the cage member 50. An additional benefit in the structure of the preferred form is that the resiliency of the actuator ring 54 against the friction ring 52 may be readily controlled by variation of tension in the garter springs 55.

Notwithstanding the detailed description of the preferred embodiments as herein described, there are numerous other embodiments which lend themselves to the present invention, as will be apparent from the appended claims.

What is claimed is:

1. A two way overrunning roller clutch drive system including a case, two axles, and two pairs of complimentary drive and driven rotary members, each pair of rotary members sharing one of said axles, each said driven member including an axially extending bore, each said drive member having an end thereof disposed within said bore, each pair of said drive and driven members thus defining an axially extending annulus, each said pair further including a cage and a plurality of rollers positioned within said annulus, said cage disposed for maintaining said rollers in spaced relationship within said annulus, said cage further including a friction ring, wherein said drive system further includes an actuator ring in constant, resilient, frictional engagement with said friction ring, said actuator ring containing a plurality of circumferentially disposed garter springs thereabout, said overrunning clutch system further comprising means for positively locking said actuator ring to said case including a plurality of radially disposed detents uniformly spaced about said ring, said system further comprising a plunger supported in said case, said plunger extending radially inwardly toward said actuator ring and radially moveable into positive engagement with said ring, said plunger having first and second ends, said first end selectively moveable into one of said detents, said system further comprising a cam member also supported in said case, said cam member disposed for movement transversely to said second end of said plunger, said cam member including a cam surface engageable with said second end of said plunger, means for actuating said cam member to effect a positive engagement of said first end of said plunger with one of said detents, whereby engagement of said first end of said plunger with one of said detents frictionally energizes said actuator ring and said actuator ring is momentarily grounded to said case to effectuate lock-up of said rollers relative to said drive and driven members through said friction ring.

2. The roller clutch drive system of claim 1 wherein said actuation means comprises an electric solenoid.

* * * * *